(12) United States Patent
Chen et al.

(10) Patent No.: US 11,604,466 B2
(45) Date of Patent: Mar. 14, 2023

(54) ROBOT BALANCE CONTROL METHOD, COMPUTER-READABLE STORAGE MEDIUM AND ROBOT

(71) Applicant: UBTECH ROBOTICS CORP LTD, Shenzhen (CN)

(72) Inventors: Chunyu Chen, Shenzhen (CN); Yizhang Liu, Shenzhen (CN); Ligang Ge, Shenzhen (CN); Zheng Xie, Shenzhen (CN); Youjun Xiong, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 221 days.

(21) Appl. No.: 17/120,232

(22) Filed: Dec. 13, 2020

(65) Prior Publication Data
US 2021/0181748 A1 Jun. 17, 2021

(30) Foreign Application Priority Data
Dec. 13, 2019 (CN) .......................... 201911279537.5

(51) Int. Cl.
*B25J 9/16* (2006.01)
*B62D 57/02* (2006.01)
(Continued)

(52) U.S. Cl.
CPC ........... *G05D 1/0212* (2013.01); *B62D 57/02* (2013.01); *G01L 5/16* (2013.01); *G05B 19/4155* (2013.01);
(Continued)

(58) Field of Classification Search
CPC .... B25J 9/1664; B25J 19/0008; B25J 9/1607; B25J 11/0035; B25J 13/089; B25J 9/1653;
(Continued)

(56) References Cited

U.S. PATENT DOCUMENTS

2005/0110448 A1\* 5/2005 Takenaka ............. B62D 57/032
318/568.12
2007/0016329 A1\* 1/2007 Herr ........................ A61F 2/70
700/250
(Continued)

FOREIGN PATENT DOCUMENTS

JP 2017144512 A 8/2017

OTHER PUBLICATIONS

Jeong et al. "Biped walking stabilization based on foot placement control using capture point feedback", Sep. 24-28, 2017, 2017 IEEE/RSJ International Conference on Intelligent Robots and Systems (IROS), pp. 5263-5269, https://ieeexplore.ieee.org/document/8206418?source=IQplus (Year: 2017).\*

*Primary Examiner* — Khoi H Tran
*Assistant Examiner* — Tanner L Cullen (57) ABSTRACT

A robot balance control method includes: obtaining force information associated with a left foot and a right foot of the robot; calculating a zero moment point of a center of mass (COM) of a body of the robot based on the force information; calculating a first position offset and a second position offset of the robot according to the zero moment point of the COM of the body; updating a position trajectory of the robot according to the first position offset and the second offset to obtain an updated position of the COM of the body; performing inverse kinematics analysis on the updated position of the COM of the body to obtain joint angles of the left leg
(Continued)

and the right leg of the robot; and controlling the robot to move according to the joint angles.

15 Claims, 8 Drawing Sheets

(51) Int. Cl.
    *G05D 1/02*           (2020.01)
    *G05B 19/4155*     (2006.01)
    *G01L 5/16*           (2020.01)

(52) U.S. Cl.
    CPC ........... *G05D 1/0268* (2013.01); *B25J 9/1664* (2013.01); *G05B 2219/50391* (2013.01)

(58) Field of Classification Search
    CPC ........ G05B 19/4155; G05B 2219/3921; G05B 2219/40264; G05B 2219/50391; B62D 57/02; B62D 57/032; G05D 1/0212; G05D 1/0268

See application file for complete search history.

(56) References Cited

U.S. PATENT DOCUMENTS

| | | | |
|---|---|---|---|
| 2009/0187275 A1* | 7/2009 | Suga | B62D 57/032 901/1 |
| 2012/0277910 A1* | 11/2012 | Doi | B62D 57/032 901/1 |
| 2013/0173054 A1* | 7/2013 | Seo | B62D 57/032 901/1 |
| 2015/0202768 A1* | 7/2015 | Moridaira | B62D 57/032 901/1 |
| 2018/0004208 A1* | 1/2018 | Su | G05D 1/021 |

\* cited by examiner

ROBOT BALANCE CONTROL METHOD, COMPUTER-READABLE STORAGE MEDIUM AND ROBOT

CROSS REFERENCE TO RELATED APPLICATIONS

This application claims priority to Chinese Patent Application No. CN201911279537.5, filed Dec. 13, 2019, which is hereby incorporated by reference herein as if set forth in its entirety.

BACKGROUND

1. Technical Field

The present disclosure generally relates to robots, and particularly to a robot balance control method for controlling a biped robot.

2. Description of Related Art

For some conventional biped robots, when they need to bend over to pick up an object, it is difficult for them to reasonably plan the trajectory of their centers of mass, which results in poor stability. Thus, these robots may tend to fall over when they bend over to pick up objects. Therefore, there is a need to provide a robot balance control method to overcome the above-mentioned problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 1:
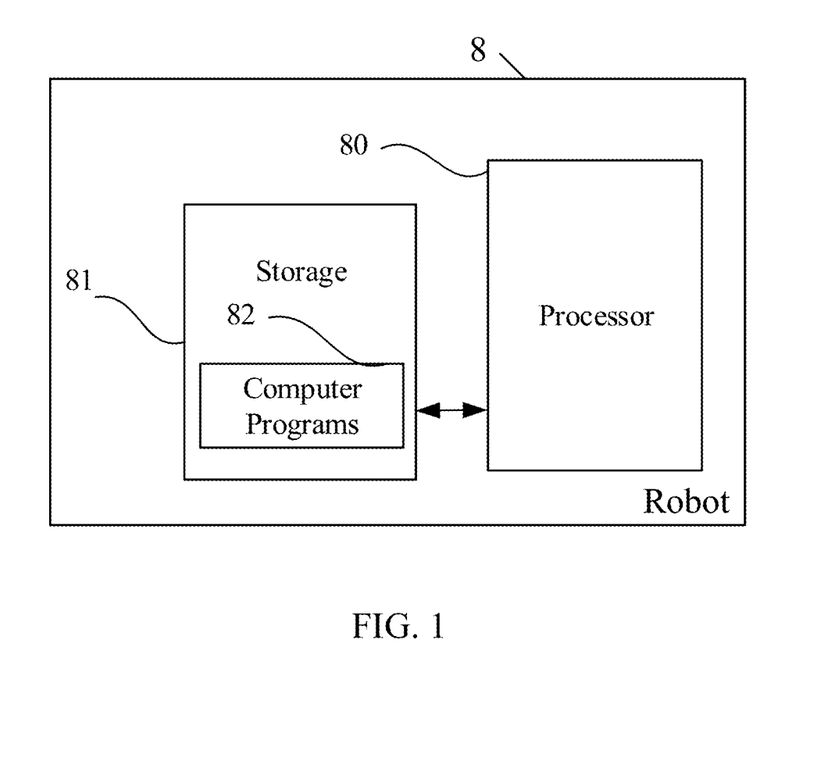
FIG. 1 is a schematic block diagram of a robot according to one embodiment.

FIG. 1 is a schematic block diagram of a robot 8 according to one embodiment. The robot 8 may be a biped robot. The robot 8 includes a processor 80, a storage 81, one or more computer programs 82 stored in the storage 81 and executable by the processor 80. When the processor 80 executes the computer programs 82, the steps in the embodiments of the method for controlling the robot 8, such as steps S101 through S106 in FIG. 2, steps S1021 to S1023 in FIG. 5, steps S1031 through S1033 in FIG. 6, steps S1034 through S1035 in FIG. 7, and functions of modules/units in the embodiments, such as units 701 through 706 in FIG. 8 are implemented.

Exemplarily, the one or more computer programs 82 may be divided into one or more modules/units, and the one or more modules/units are stored in the storage 81 and executed by the processor 80. The one or more modules/units may be a series of computer program instruction segments capable of performing specific functions, and the instruction segments are used to describe the execution process of the one or more computer programs 82 in the robot 8. For example, the one or more computer programs 82 may be divided into a force information acquiring module, a zero moment point calculating module, a position offset calculating module, a position updating module, an inverse dynamics analyzing module, and a motion control module. The specific functions of each module will be described in detail later.

It should be noted that FIG. 1 is merely an example of the robot 8, and does not limit the robot 8. The robot 8 may include components different in numbers from those illustrated, or incorporate some other different components. For example, the robot 8 may further include an input and output device, a network access device, a bus, and the like.

The processor 80 may be a central processing unit (CPU), a general purpose processor, a digital signal processor (DSP), an application specific integrated circuit (ASIC), a field-programmable gate array (FPGA), a programmable logic device, a discrete gate, a transistor logic device, or a discrete hardware component. The general purpose processor may be a microprocessor or any conventional processor or the like.

The storage 81 may be an internal storage unit of the robot 8, such as a hard disk or a memory. The storage 81 may also be an external storage device of the robot 8, such as a plug-in hard disk, a smart memory card (SMC), and a secure digital (SD) card, or any suitable flash cards. Furthermore, the storage 81 may also include both an internal storage unit and an external storage device. The storage 81 is used to store computer programs, other programs, and data required by the robot. The storage 81 can also be used to temporarily store data that have been output or is about to be output.

Figure 2:
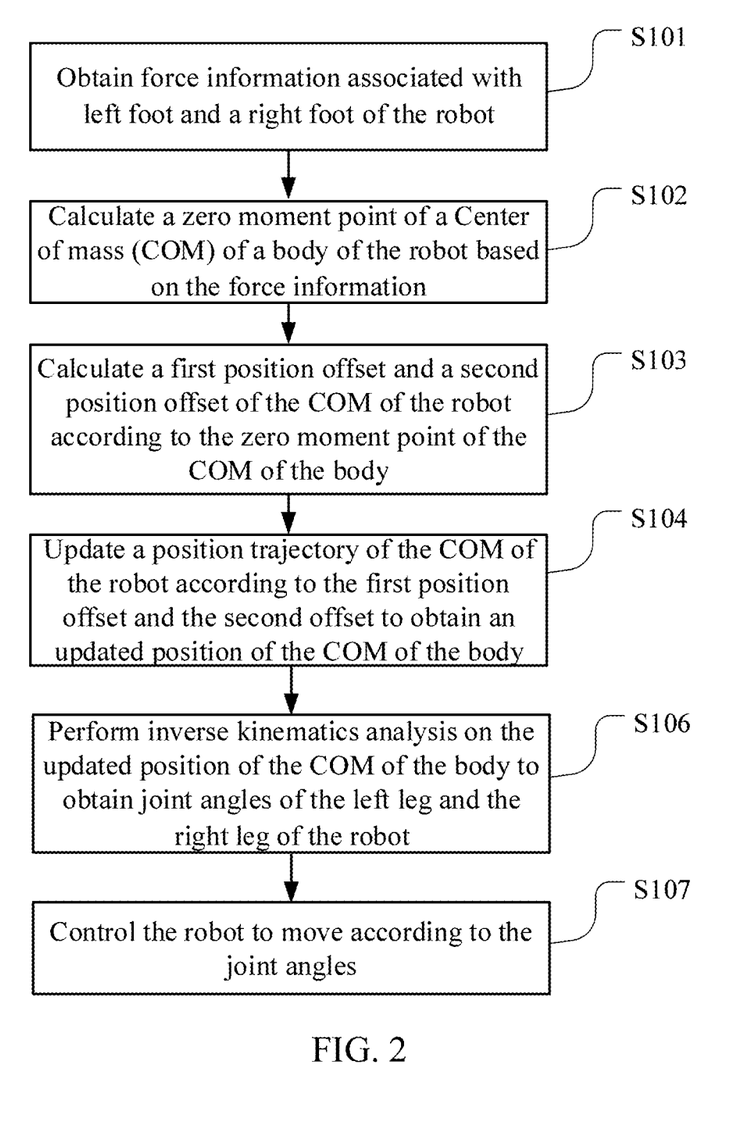
FIG. 2 is a schematic flowchart of a robot balance control method according to one embodiment.

FIG. 2 shows an exemplary flowchart of robot balance control method that may include the following steps.

Step S101: Obtain force information associated with a left foot and a right foot of the robot 8.

Figure 3:
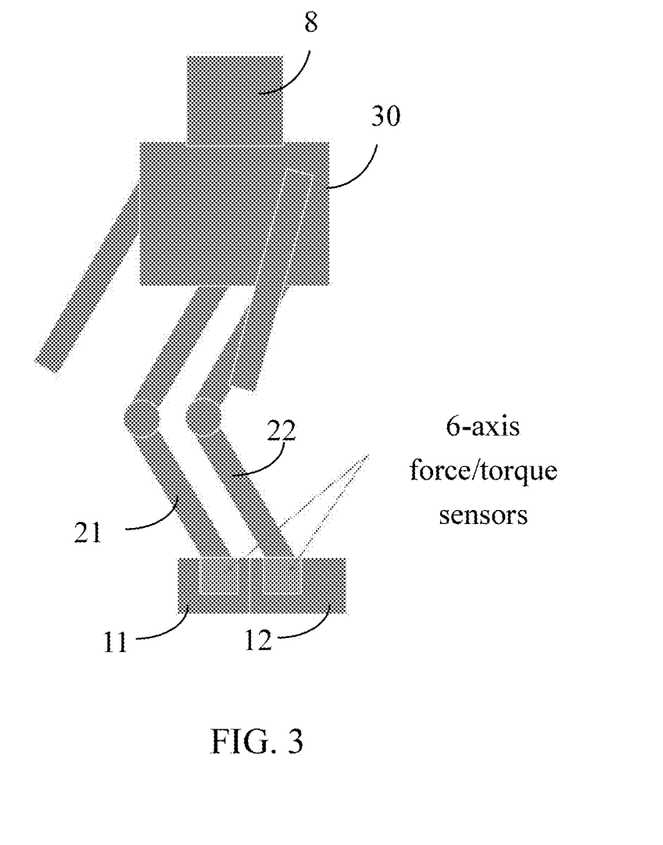
FIG. 3 is a schematic diagram showing a biped robot according to one embodiment.

In one embodiment, the robot 8 may be a biped robot. As shown in FIG. 3, two sensors can be respectively arranged at the connecting portions between the left foot 12 and the left leg 22 of the robot 8, and between the right foot 11 and the right leg 21 of the robot 8 to obtain the force information associated with the left foot 12 and the force information associated with the right foot 11 of the robot 8.

In one embodiment, the sensors may be six-axis force/torque sensors that can detect the force information associated with the left foot 12 and the force information associated with the right foot 11. For example, in a three-dimensional coordinate system shown in FIG. 4 where x-axis and y-axis lie on the sole of the left foot 12 of the robot 8 and z-axis is perpendicular to the sole of the left foot 12 and passes through a center of the six-axis force/torque sensor on the left foot 12, the force information of the left foot 12 includes three force components on the x-axis, y-axis and z-axis, and three torque components about the three axes. The force information of the left foot can be expressed as follows: $F_l=[f_{lx}\ f_{ly}\ f_{lz}\ \tau_{lx}\ \tau_{ly}\ \tau_{lz}]^T$, where $f_{lx}$ represents the force component of the force information of the left foot on the x-axis, $f_{ly}$ represents the force component of the force information of the left foot on the y-axis, $f_{lz}$ represents the force component of the force information of the left foot on the z-axis, $\tau_{lx}$ represents the torque component of the force information of the left foot about the x-axis, $\tau_{ly}$ represents the torque component of the force information of the left foot about the y-axis, and $\tau_{lz}$ represents the torque component of the force information of the left foot about the z-axis.

Similarly, a three-dimensional coordinate system can be established for the right foot of the robot 8 where x-axis and y-axis lie on the sole of the right foot of the robot 8 and z-axis is perpendicular to the sole of the right foot. The force information of the right foot can be expressed as follows: $F_r=[f_{rx}\ f_{ry}\ f_{rz}\ \tau_{rx}\ \tau_{ry}\ \tau_{rz}]^T$, where $f_{rx}$ represents the force component of the force information of the right foot on the x-axis, $f_{ry}$ represents the force component of the force information of the right foot on the y-axis, $f_{rz}$ represents the force component of the force information of the right foot on the z-axis, $\tau_{rx}$ represents the torque component of the force information of the right foot about the x-axis, $\tau_{ry}$ represents the torque component of the force information of the right foot about the y-axis, and $\tau_{rz}$ represents the torque component of the force information of the right foot about the z-axis.

Figure 5:
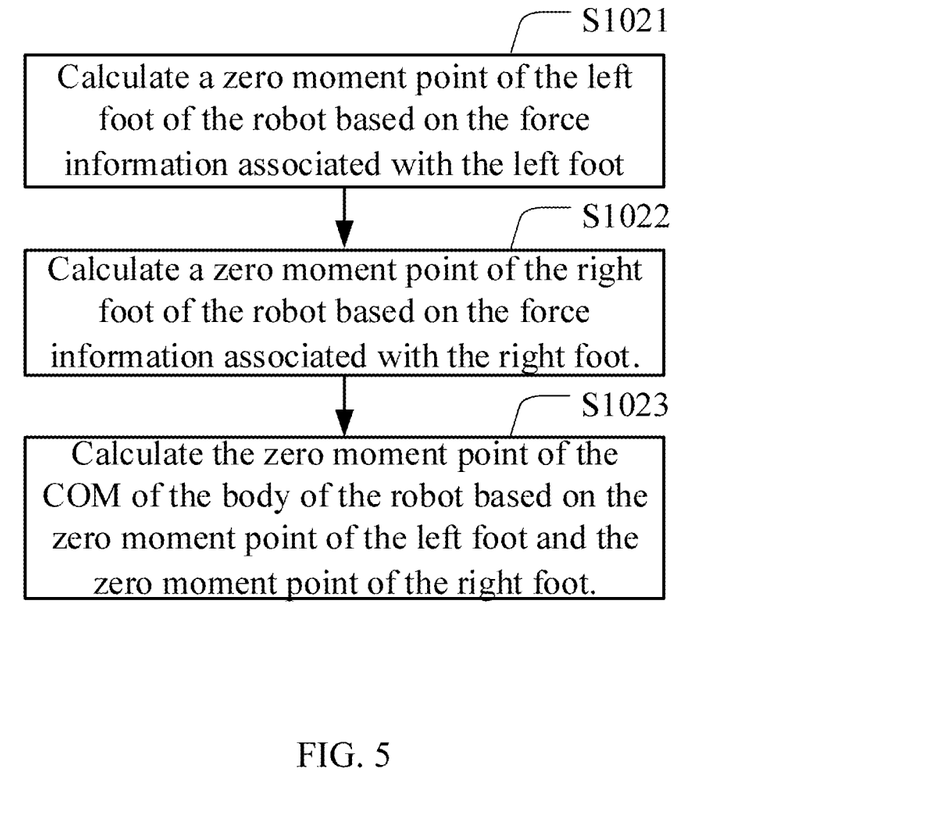
FIG. 5 is a schematic flowchart of method for calculating a zero moment point of a COM of a body of the robot.

Step S102: Calculate a zero moment point (ZMP) of a center of mass (COM) of a body 30 (see FIG. 3) of the robot 8 based on the force information. Referring to FIG. 5, in one embodiment, step S102 may include the following steps.

Figure 4:
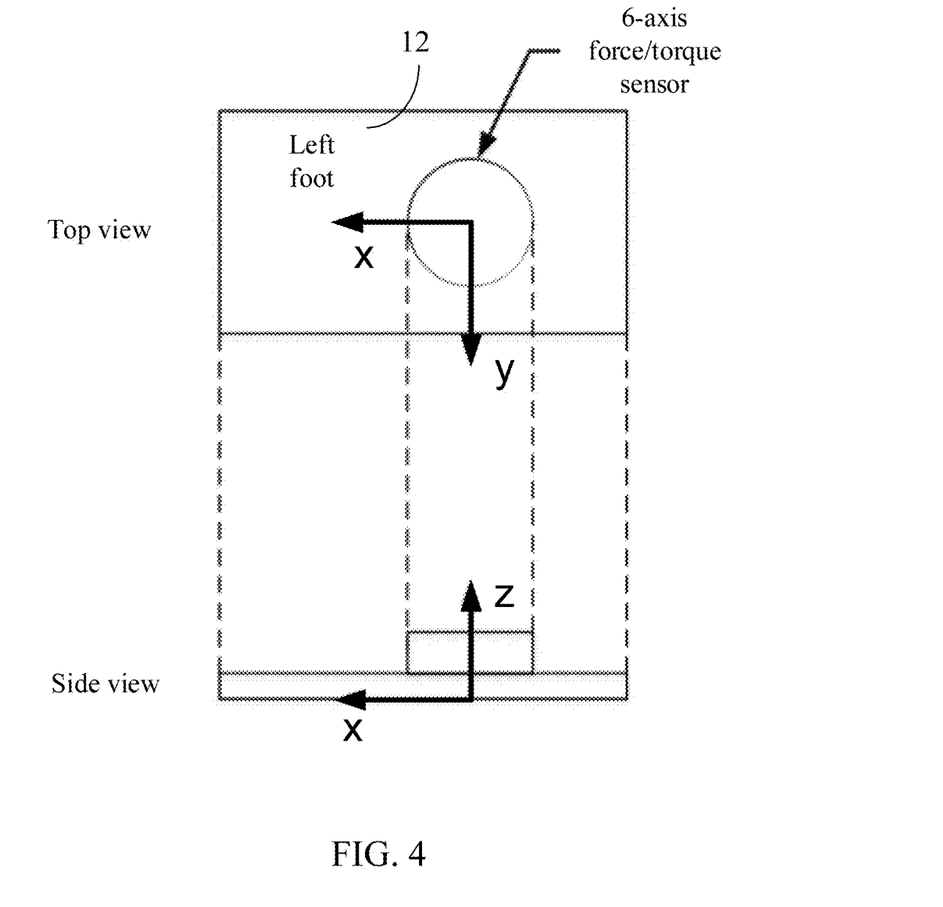
FIG. 4 shows a schematic diagram of a top view and a side view of a foot of the robot.

Step S1021: Calculate a zero moment point of the left foot of the robot 8 based on the force information associated with the left foot. Specifically, the ZMP of the left foot can be calculated according to formulas as follows: $p_{lx}=(-\tau_{ly}-f_{lx}d)/f_{lz}$; $p_{ly}=(-\tau_{lx}-f_{ly}d)/f_{lz}$; $p_l=[p_{lx}\ p_{ly}\ 0]^T$, where d represents a distance from the six-axis force/torque sensor of the left foot to the sole of the left foot, $p_{lx}$ represents an x-coordinate of the zero moment point of the left foot, $p_{ly}$ represents a y-coordinate of the zero moment point of the left foot, and $p_l$ represents the zero moment point of the left foot. In one embodiment, these variables are measured in a left foot coordinate system (e.g., a coordinate system as shown in FIG. 4).

Step S1022: Calculate a zero moment point of the right foot of the robot 8 based on the force information associated with the right foot. Specifically, the ZMP of the right foot can be calculated according to formulas as follows: $p_{rx}=(-\tau_{ry}-f_{rx}d)/f_{rx}$; $p_{ry}=(-\tau_{rx}-f_{ry}d)/f_{rz}$; $p_r=[p_{rx}\ p_{ry}\ 0]^T$, where d represents a distance from the six-axis force/torque sensor of the right foot to the sole of the right foot, $p_{rx}$ represents an x-coordinate of the zero moment point of the right foot, $p_{ry}$ represents a y-coordinate of the zero moment point of the right foot, and $p_r$ represents the zero moment point of the right foot. In one embodiment, these variables are measured in a right foot coordinate system where x-axis and y-axis lie on the sole of the right foot of the robot and z-axis is perpendicular to the sole of the right foot and passes through a center of the six-axis force/torque sensor on the right foot of the robot.

Step S1023: Calculate the zero moment point of the COM of the body of the robot 8 based on the zero moment point of the left foot and the zero moment point of the right foot. In one embodiment, the ZMP of the COM of the body of the robot 8 can be calculated according to formulas as follows:

$$p_{bx}=\frac{p_{rx}\times f_{rz}+p_{lx}+f_{lz}}{f_{rz}+f_{lz}}; p_{by}=\frac{p_{ry}\times f_{rz}+p_{ly}+f_{lz}}{f_{rz}+f_{lz}};$$

$$p_b=[p_{bx}\ p_{by}\ 0]^T,$$

$p_b=[p_{bx}\ p_{by}\ 0]^T$, where $p_{bx}$ represents an x-coordinate of the zero moment point of the COM of the body, $p_{by}$ represents a y-coordinate of the zero moment point of the COM of the body, $p_b$ represents the zero moment point of the COM of the body. In one embodiment, the zero moment point of the COM of the body is a zero moment point measured in a COM coordinate system where the origin of the COM coordinate system lies on the COM of the body. That is, $p_{bx}$ represents a number that describes a horizontal position of the zero moment point in terms of distance and direction along the x-axis of the COM coordinate system, and $p_{by}$ represents a number that describes a horizontal position of the zero moment point in terms of distance and direction along the y-axis of the COM coordinate system.

Figure 6:
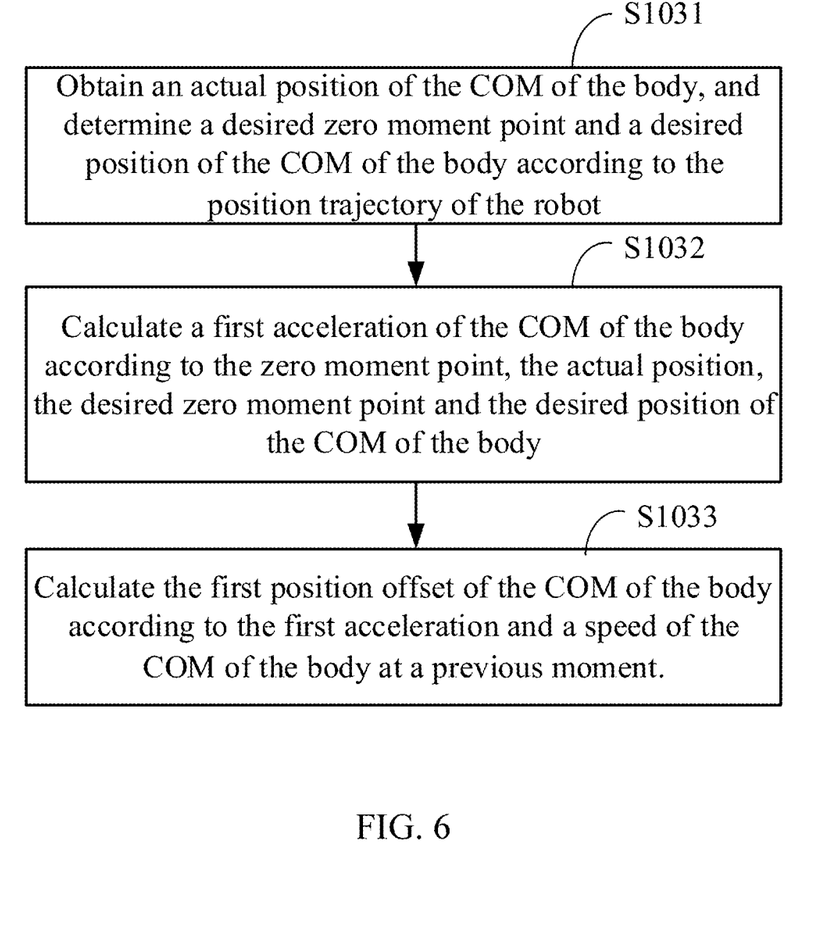
FIG. 6 is a schematic flowchart of method for calculating a first position offset of the COM of the body according to one embodiment.

Step S103: Calculate a first position offset and a second position offset of the COM of the robot according to the zero moment point of the COM of the body. Referring to FIG. 6, in one embodiment, calculating the first position offset may include the following steps.

Step S1031: Obtain an actual position of the COM of the body, and determine a desired zero moment point and a desired position of the COM of the body according to the position trajectory of the robot 8.

Step S1032: Calculate a first acceleration of the COM of the body according to the zero moment point, the actual position, the desired zero moment point and the desired position of the COM of the body.

In one embodiment, the component of the first acceleration of the COM of the body on the x-axis can be calculated according to a formula as follows: $a1_x=K1_{zmp}(p_{dx}-p_{bx})+K1_p(x_{dx}-x_{rx})$, where $p_{bx}$ represents an x-coordinate of the zero moment point of the COM of the body, $p_{dx}$ represents an x-coordinate of the desired zero moment point of the COM of the body, $x_{rx}$ represents an x-coordinate of the actual position of the COM of the body, $x_{dx}$ represents an x-coordinate of the desired position of the COM of the body, $K1_{zmp}$ represents a preset first coefficient, $K1_p$ represents a preset second coefficient, $a1_x$ represents the component of the first acceleration of the COM of the body on the x-axis.

In one embodiment, the component of the first acceleration of the COM of the body on the y-axis can be calculated according to a formula as follows: $a1_y=K1_{zmp}(p_{dy}-p_{by})+K1_p$ ($x_{dy}-x_{ry}$), where $p_{by}$ represents a y-coordinate of the zero moment point of the COM of the body, $p_{dy}$ represents a y-coordinate of the desired zero moment point of the COM of the body, $x_{ry}$ represents a y-coordinate of the actual position of the COM of the body, $x_{dy}$ represents a y-coordinate of the desired position of the COM of the body, and i represents the component of the first acceleration of the COM of the body on the y-axis.

Step S1033: Calculate the first position offset of the COM of the body according to the first acceleration and a velocity of the COM of the body at a previous moment.

In one embodiment, the component of the first position offset of the COM of the body on an x-axis can be calculated according to a formula as follows:

$$\Delta x1 = v_x t + \frac{1}{2}a1_x t^2,$$

where $v_x$ represents a component of the velocity of the COM of the body at the previous moment on the x-axis, t represents running time of a preset program, and $\Delta x1$ represents the component of the first position offset of the COM of the body on the x-axis.

In one embodiment, the component of the first position offset of the COM of the body on a y-axis can be calculated according to a formula as follows:

$$\Delta y1 = v_y t + \frac{1}{2}a1_y t^2,$$

where $v_y$ represents a component of the velocity of the COM of the body at the previous moment on the y-axis, t represents running time of the preset program, and $\Delta y1$ represents the component of the first position offset of the COM of the body on the y-axis.

Figure 7:
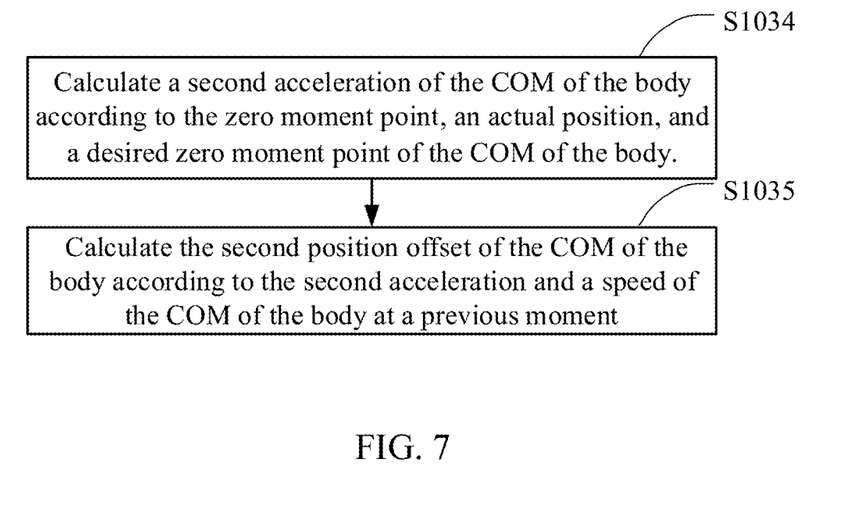
FIG. 7 is a schematic flowchart of method for according to one embodiment.
Figure 8:
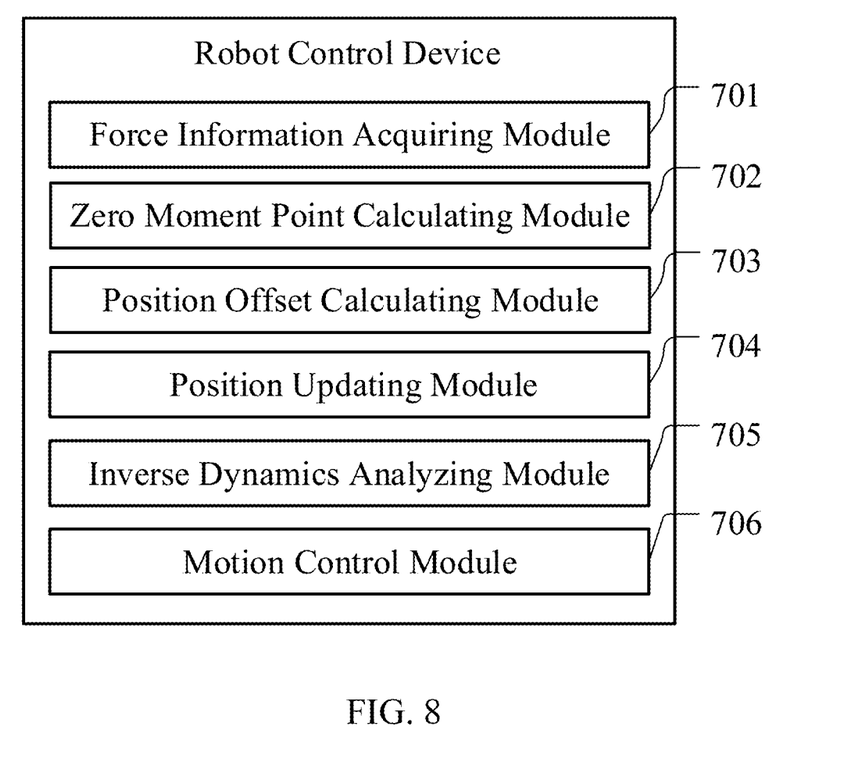
FIG. 8 is a schematic block diagram of a robot balance control device according to one embodiment.

Referring to FIG. 7, in one embodiment, calculating the second position offset may include the following steps.

Step S1034: Calculate a second acceleration of the COM of the body according to the zero moment point, an actual position, and a desired zero moment point of the COM of the body.

In one embodiment, the component of the second acceleration of the COM of the body on an x-axis can be calculated according to a formula as follows: $a2_x=K2_{zmp}(p_{dx}-p_{bx})+K2_p(0-x_{rx})$, where $p_{bx}$ represents an x-coordinate of the zero moment point of the COM of the body, $p_{dx}$ represents an x-coordinate of the desired zero moment point of the COM of the body, $x_{rx}$ represents an x-coordinate of the actual position of the COM of the body, $K2_{zmp}$ represents a preset third coefficient, $K2_p$ represents a preset fourth coefficient, $a2_x$ represents the component of the second acceleration of the COM of the body on the x-axis.

In one embodiment, the component of the second acceleration of the COM of the body on a y-axis can be calculated according to a formula as follows: $a2_y=K2_{zmp}(p_{dy}-p_{by})+K2_p(0-x_{ry})$, where $p_{by}$ represents a y-coordinate of the zero moment point of the COM of the body, $p_{dy}$ represents a y-coordinate of the desired zero moment point of the COM of the body, $x_{ry}$ represents a y-coordinate of the actual position of the COM of the body, and $a2_y$ represents the component of the second acceleration of the COM of the body on the y-axis.

Step S1035: Calculate the second position offset of the COM of the body according to the second acceleration and a velocity of the COM of the body at a previous moment.

In one embodiment, the component of the second position offset of the COM of the body on an x-axis can be calculated according to a formula as follows:

$$\Delta x2 = v_x t + \frac{1}{2}a2_x t^2,$$

where $v_x$ represents a component of the velocity of the COM of the body at the previous moment on the x-axis, t represents running time of a preset program, and $\Delta x2$ represents component of the second position offset of the COM of the body on the x-axis.

In one embodiment, the component of the second position offset of the COM of the body on a y-axis can be calculated according to a formula as follows:

$$\Delta y2 = v_y t + \frac{1}{2}a2_y t^2,$$

where $v_y$ represents a component of the velocity of the COM of the body at the previous moment on the y-axis, t represents running time of the preset program, and $\Delta y2$ represents the component of the second position offset of the COM of the body on the y-axis.

Step S104: Update a position trajectory of the COM of the robot according to the first position offset and the second offset to obtain an updated position of the COM of the body.

In one embodiment, the x-coordinate of the updated position of the COM of the body can be calculated according to a formular as follows: $x_{new}=x_{dx}+\Delta x1+\Delta x2$, where $x_{new}$ represents the x-coordinate of the updated position of the COM of the body. The y-coordinate of the updated position of the COM of the body can be calculated according to a formular as follows: $y_{new}=x_{dy}+\Delta y1+\Delta y2$, where $y_{new}$ represents the y-coordinate of the updated position of the COM of the body.

Step S105: Perform inverse kinematics analysis on the updated position of the COM of the body to obtain joint angles of legs of the robot.

Inverse kinematics analysis is an analysis method commonly used in the field of robotics. For details, please refer to any conventional inverse kinematics analysis process, which will not be repeated in the present disclosure.

In one embodiment, the joint angles of the left leg include a hip joint pitch angle, a hip joint yaw angle, a hip joint roll angle, a knee joint pitch angle, an ankle joint pitch angle, and an ankle joint roll angle that are associated with the left leg of the robot. The joint angles of the left leg are expressed as follows: $\theta_l=[\theta_{l1}\ \theta_{l2}\ \theta_{l3}\ \theta_{l4}\ \theta_{l5}\ \theta_{l6}]^T$.

In one embodiment, the joint angles of the right leg include a hip joint pitch angle, a hip joint yaw angle, a hip joint roll angle, a knee joint pitch angle, an ankle joint pitch angle, and an ankle joint roll angle that are associated with the right leg of the robot. The joint angles of the left leg are expressed as follows: $\theta_r=[\theta_{r1}\ \theta_{r2}\ \theta_{r3}\ \theta_{r4}\ \theta_{r5}\ \theta_{r6}]^T$.

Step S106: Control the robot to move according to the joint angles.

After the joint angles associated with the left leg and the right leg are obtained, the robot 8 can be controlled to move according to the joint angles, so as to realize compliance control of the robot 8.

With the robot control method describe above, when the robot 8 needs to bend down to pick up an object, the position of the center of mass of the body of the robot can be updated in real time according to the force information associated with the feet of the robot, and the joint angles of the robot can be adjusted accordingly, which is beneficial to improve the stability of the robot during the bending process and prevent the robot from falling over.

It should be understood that sequence numbers in the foregoing processes do not indicate execution sequences. Execution sequences of the processes should be determined according to functions and internal logic of the processes, and shall not constitute any limitation on implementation processes of the embodiments of the present application.

Referring to FIG. 8, in one embodiment, a robot balance control device may include a force information acquiring module 701, a zero moment point calculating module 702, a position offset calculating module 703, a position updating module 704, an inverse dynamics analyzing module 705, and a motion control module 706.

In one embodiment, the force information acquiring module 701 is configured to obtain force information associated with a left foot and a right foot of the robot. The zero moment point calculating module 702 is configured to calculate a zero moment point of a center of mass (COM) of a body of the robot based on the force information. The position offset calculating module 703 is configured to calculate a first position offset and a second position offset of the robot according to the zero moment point of the COM of the body. The position updating module 704 is configured to update a position trajectory of the robot according to the first position offset and the second offset to obtain an updated position of the COM of the body. The inverse dynamics analyzing module 705 is configured to perform inverse kinematics analysis on the updated position of the COM of the body to obtain joint angles of the left leg and the right leg of the robot. The motion control module 706 is configured to control the robot to move according to the joint angles.

In one embodiment, the position offset calculating module 703 may include a position information determining module, a first acceleration calculating module, a first position offset calculating module. The position information determining module is configured to obtain an actual position of the COM of the body, and determine a desired zero moment point and a desired position of the COM of the body according to the position trajectory of the robot. The first acceleration calculating module is configured to calculate a first acceleration of the COM of the body according to the zero moment point, the actual position, the desired zero moment point and the desired position of the COM of the body. The first position offset calculating module is configured to calculate the first position offset of the COM of the body according to the first acceleration and a velocity of the COM of the body at a previous moment.

In one embodiment, the first acceleration calculating module may include a first calculating sub-module and a second calculating sub-module. The first calculating sub-module is configured to calculating the component of the first acceleration of the COM of the body on the x-axis according to a formula as follows: $a1_x = K1_{zmp}(p_{dx}-p_{bx}) + K1_p(x_{dx}-x_{rx})$, where $p_{bx}$ represents an x-coordinate of the zero moment point of the COM of the body, $p_{dx}$ represents an x-coordinate of the desired zero moment point of the COM of the body, $x_{rx}$ represents an x-coordinate of the actual position of the COM of the body, $x_{dx}$ represents an x-coordinate of the desired position of the COM of the body, $K1_{zmp}$ represents a preset first coefficient, $K1_p$ represents a preset second coefficient, $a1_x$ represents the component of the first acceleration of the COM of the body on the x-axis.

In one embodiment, the second calculating sub-module is configured to calculate the component of the first acceleration of the COM of the body on the y-axis according to a formula as follows: $a1_y = K1_{zmp}(p_{dy}-p_{by}) + K1_p(x_{dy}-x_{ry})$, where $p_{by}$ represents a y-coordinate of the zero moment point of the COM of the body, $p_{dy}$ represents a y-coordinate of the desired zero moment point of the COM of the body, $x_{ry}$ represents a y-coordinate of the actual position of the COM of the body, $x_{dy}$ represents a y-coordinate of the desired position of the COM of the body, and $a1_y$ represents the component of the first acceleration of the COM of the body on the y-axis.

In one embodiment, first position offset calculating module may include a third calculating sub-module and a fourth calculating sub-module. The third calculating sub-module is configured to calculate the component of the first position offset of the COM of the body on an x-axis according to a formula as follows:

$$\Delta x1 = v_x t + \frac{1}{2} a1_x t^2,$$

where $v_x$ represents a component of the velocity of the COM of the body at the previous moment on the x-axis, t represents running time of a preset program, and $\Delta x1$ represents the component of the first position offset of the COM of the body on the x-axis.

In one embodiment, the fourth calculating sub-module is configured to calculate the component of the first position offset of the COM of the body on a y-axis according to a formula as follows:

$$\Delta y1 = v_y t + \frac{1}{2} a1_y t^2,$$

where $v_y$ represents a component of the velocity of the COM of the body at the previous moment on the y-axis, t represents running time of the preset program, and $\Delta y1$ represents the component of the first position offset of the COM of the body on the y-axis.

In one embodiment, the position offset calculating module may further include a second acceleration calculating module and a second position offset calculating module. The second acceleration calculating module is configured to calculate a second acceleration of the COM of the body according to the zero moment point, an actual position, and a desired zero moment point of the COM of the body. The second position offset calculating module is configured to calculate the second position offset of the COM of the body according to the second acceleration and a velocity of the COM of the body at a previous moment.

In one embodiment, the second acceleration calculating module may include a fifth calculating module and a sixth calculating module. The fifth calculating module is configured to calculate a component of the second acceleration of the COM of the body on an x-axis according to a formula as follows: $a2_x = K2_{zmp}(p_{dx}-p_{bx}) + K2_p(0-x_{rx})$, where $p_{bx}$ represents an x-coordinate of the zero moment point of the COM of the body, $p_{bx}$ represents an x-coordinate of the desired zero moment point of the COM of the body, $x_{rx}$ represents an x-coordinate of the actual position of the COM of the body, $K2_{zmp}$ represents a preset third coefficient, $K2_p$ represents a preset fourth coefficient, $a2_x$ represents the component of the second acceleration of the COM of the body on the x-axis; and In one embodiment, the sixth calculating module is configured to calculate a component of the second acceleration of the COM of the body on a y-axis according to a formula as follows: $a2_y = K2_{zmp}(p_{dy} - p_{by}) + K2_p(0 - x_{ry})$, where $p_{by}$ represents a y-coordinate of the zero moment point of the COM of the body, $p_{dy}$ represents a y-coordinate of the desired zero moment point of the COM of the body, $x_{ry}$ represents a y-coordinate of the actual position of the COM of the body, and $a2_y$ represents the component of the second acceleration of the COM of the body on the y-axis.

The second position offset calculating module may include a seventh calculating module and an eighth calculating module. The seventh calculating module is configured to calculate a component of the second position offset of the COM of the body on an x-axis according to a formula as follows:

$$\Delta x2 = v_x t + \frac{1}{2} a2_x t^2,$$

where $v_x$ represents a component of the velocity of the COM of the body at the previous moment on the x-axis, t represents running time of a preset program, and $\Delta x2$ represents component of the second position offset of the COM of the body on the x-axis.

In one embodiment, the eighth calculating module is configured to calculate a component of the second position offset of the COM of the body on a y-axis according to a formula as follows:

$$\Delta y2 = v_y t + \frac{1}{2} a2_y t^2,$$

where $v_y$ represents a component of the velocity of the COM of the body at the previous moment on the y-axis, t represents running time of the preset program, and $\Delta y2$ represents the component of the second position offset of the COM of the body on the y-axis.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals. It should be noted that, the content included in the computer readable medium could be appropriately increased and decreased according to requirements of legislation and patent practice under judicial jurisdictions. For example, in some judicial jurisdictions, the computer readable medium does not include the electric carrier signal and the telecommunication signal according to the legislation and the patent practice.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented robot balance control method executed by one or more processors of a robot, the method comprising:
   obtaining force information associated with a left foot and a right foot of the robot;
   calculating a zero moment point of a center of mass (COM) of a body of the robot based on the force information;
   calculating a first position offset and a second position offset of the COM of the robot according to the zero moment point of the COM of the body;
   updating a position trajectory of the COM of the robot according to the first position offset and the second offset to obtain an updated position of the COM of the body;
   performing inverse kinematics analysis on the updated position of the COM of the body to obtain joint angles of the left leg and the right leg of the robot; and
   controlling the robot to move according to the joint angles;
   wherein calculating the second position offset comprises:
   calculating a second acceleration of the COM of the body according to the zero moment point, an actual position, and a desired zero moment point of the COM of the body; and
   calculating the second position offset of the COM of the body according to the second acceleration and a velocity of the COM of the body at a previous moment; and
   wherein calculating the second acceleration of the COM of the body according to the zero moment point, the actual position, and the desired zero moment point of the COM of the body, comprises:
   calculating a component of the second acceleration of the COM of the body on an x-axis according to a formula as follows:
   $a2_x=K2_{zmp}(p_{dx}+p_{bx})+K2_p(0-x_{rx})$, where $p_{bx}$ represents an x-coordinate of the zero moment point of the COM of the body, $p_{dx}$ represents an x-coordinate of the desired zero moment point of the COM of the body, $x_{rx}$ represents an x-coordinate of the actual position of the COM of the body, $K2_{zmp}$ represents a preset third coefficient, $K2_p$ represents a preset fourth coefficient, $a2_x$ represents the component of the second acceleration of the COM of the body on the x-axis; and
   calculating a component of the second acceleration of the COM of the body on a y-axis according to a formula as follows:
   $a2_y=K2_{zmp}(p_{dy}+p_{by})+K2_p(0-x_{ry})$, where $p_{by}$ represents a y-coordinate of the zero moment point of the COM of the body, $p_{dy}$ represents a y-coordinate of the desired zero moment point of the COM of the body, $x_{ry}$ represents a y-coordinate of the actual position of the COM of the body, and $a2_y$ represents the component of the second acceleration of the COM of the body on the y-axis.

2. The computer-implemented method according to claim 1, wherein calculating the first position offset comprises:
   obtaining an actual position of the COM of the body, and determining a desired zero moment point and a desired position of the COM of the body according to the position trajectory of the robot;
   calculating a first acceleration of the COM of the body according to the zero moment point, the actual position, the desired zero moment point and the desired position of the COM of the body; and
   calculating the first position offset of the COM of the body according to the first acceleration and a velocity of the COM of the body at a previous moment.

3. The computer-implemented method according to claim 2, wherein calculating the first acceleration of the COM of the body according to the zero moment point, the actual position, the desired zero moment point and the desired position of the COM of the body, comprises:
   calculating a component of the first acceleration of the COM of the body on an x-axis according to a formula as follows: $a1_x=K1_{zmp}(p_{dx}-p_{bx})+K1_p(x_{dx}-x_{rx})$, where $p_{bx}$ represents an x-coordinate of the zero moment point of the COM of the body, $p_{dx}$ represents an x-coordinate of the desired zero moment point of the COM of the body, $x_{rx}$ represents an x-coordinate of the actual position of the COM of the body, $x_{dx}$ represents an x-coordinate of the desired position of the COM of the body, $K1_{zmp}$ represents a preset first coefficient, $K1_p$ represents a preset second coefficient, $a1_x$ represents the component of the first acceleration of the COM of the body on the x-axis; and
   calculating a component of the first acceleration of the COM of the body on a y-axis according to a formula as follows:
   $a1_y=K1_{zmp}(p_{dy}-p_{by})+K1_p(x_{dy}-x_{ry})$, where $p_{by}$ represents a y-coordinate of the zero moment point of the COM of the body, $p_{dy}$ represents a y-coordinate of the desired zero moment point of the COM of the body, $x_{ry}$ represents a y-coordinate of the actual position of the COM of the body, $x_{dy}$ represents a y-coordinate of the desired position of the COM of the body, and $a1_y$ represents the component of the first acceleration of the COM of the body on the y-axis.

4. The computer-implemented method according to claim 2, wherein calculating the first position offset of the COM of the body according to the first acceleration and the velocity of the COM of the body at a previous moment, comprises:
   calculating a component of the first position offset of the COM of the body on an x-axis according to a formula as follows:

$$\Delta x1 = v_x t + \frac{1}{2} a1_x t^2,$$

where $v_x$ represents a component of the velocity of the COM of the body at the previous moment on the x-axis, t represents running time of a preset program, and $\Delta x1$ represents the component of the first position offset of the COM of the body on the x-axis; and calculating a component of the first position offset of the COM of the body on a y-axis according to a formula as follows:

$$\Delta y1 = v_y t + \frac{1}{2} a1_y t^2,$$

where $v_y$ represents a component of the velocity of the COM of the body at the previous moment on the y-axis, t represents running time of the preset program, and $\Delta y1$ represents the component of the first position offset of the COM of the body on the y-axis.

5. The computer-implemented method according to claim 1, wherein calculating the second position offset of the COM of the body according to the second acceleration and the velocity of the COM of the body at the previous moment, comprises:

calculating a component of the second position offset of the COM of the body on an x-axis according to a formula as follows:

$$\Delta x2 = v_x t + \frac{1}{2} a2_x t^2,$$

where $v_x$ represents a component of the velocity of the COM of the body at the previous moment on the x-axis, t represents running time of a preset program, and $\Delta x2$ represents component of the second position offset of the COM of the body on the x-axis; and calculating a component of the second position offset of the COM of the body on a y-axis according to a formula as follows:

$$\Delta y2 = v_y t + \frac{1}{2} a2_y t^2,$$

where $v_y$ represents a component of the velocity of the COM of the body at the previous moment on the y-axis, t represents running time of the preset program, and $\Delta y2$ represents the component of the second position offset of the COM of the body on the y-axis.

6. A non-transitory computer-readable storage medium storing one or more programs to be executed in a robot, the one or more programs, when being executed by one or more processors of the robot, causing the robot to perform processing comprising:

obtaining force information associated with a left foot and a right foot of the robot;

calculating a zero moment point of a center of mass (COM) of a body of the robot based on the force information;

calculating a first position offset and a second position offset of the COM of the robot according to the zero moment point of the COM of the body;

updating a position trajectory of the COM of the robot according to the first position offset and the second offset to obtain an updated position of the COM of the body;

performing inverse kinematics analysis on the updated position of the COM of the body to obtain joint angles of the left leg and the right leg of the robot; and controlling the robot to move according to the joint angles;

wherein calculating the second position offset comprises:

calculating a second acceleration of the COM of the body according to the zero moment point, an actual position, and a desired zero moment point of the COM of the body; and calculating the second position offset of the COM of the body according to the second acceleration and a velocity of the COM of the body at a previous moment; and wherein calculating the second acceleration of the COM of the body according to the zero moment point, the actual position, and the desired zero moment point of the COM of the body, comprises:

calculating a component of the second acceleration of the COM of the body on an x-axis according to a formula as follows:

$a2_x = K2_{zmp}(p_{dx} - p_{bx}) + K2_p(0 - x_{rx})$, where $p_{bx}$ represents an x-coordinate of the zero moment point of the COM of the body, $p_{dx}$ represents an x-coordinate of the desired zero moment point of the COM of the body, $x_{rx}$ represents an x-coordinate of the actual position of the COM of the body, $K2_{zmp}$ represents a preset third coefficient, $K2_p$ represents a preset fourth coefficient, $a2_x$ represents the component of the second acceleration of the COM of the body on the x-axis; and calculating a component of the second acceleration of the COM of the body on a y-axis according to a formula as follows:

$a2_y = K2_{zmp}(p_{dy} - p_{by}) + K2_p(0 - x_{ry})$, where $p_{by}$ represents a y-coordinate of the zero moment point of the COM of the body, $p_{dy}$ represents a y-coordinate of the desired zero moment point of the COM of the body, $x_{ry}$ represents a y-coordinate of the actual position of the COM of the body, and $a2_y$ represents the component of the second acceleration of the COM of the body on the y-axis.

7. The non-transitory computer-readable storage medium according to claim 6, wherein calculating the first position offset comprises:

obtaining an actual position of the COM of the body, and determining a desired zero moment point and a desired position of the COM of the body according to the position trajectory of the robot;

calculating a first acceleration of the COM of the body according to the zero moment point, the actual position, the desired zero moment point and the desired position of the COM of the body; and calculating the first position offset of the COM of the body according to the first acceleration and a velocity of the COM of the body at a previous moment.

8. The non-transitory computer-readable storage medium according to claim 7, wherein calculating the first acceleration of the COM of the body according to the zero moment point, the actual position, the desired zero moment point and the desired position of the COM of the body, comprises:

calculating a component of the first acceleration of the COM of the body on an x-axis according to a formula as follows: $a1_x = K1_{zmp}(p_{dx} - p_{bx}) + K1_p(x_{dx} - x_{rx})$, where $p_{bx}$ represents an x-coordinate of the zero moment point of the COM of the body, $p_{dx}$ represents an x-coordinate of the desired zero moment point of the COM of the body, $x_{rx}$ represents an x-coordinate of the actual position of the COM of the body, $x_{dx}$ represents an x-coordinate of the desired position of the COM of the body, $K1_{zmp}$ represents a preset first coefficient, $K1_p$ represents a preset second coefficient, $a1_x$ represents the component of the first acceleration of the COM of the body on the x-axis; and calculating a component of the first acceleration of the COM of the body on a y-axis according to a formula as follows:

$a1_y = K1_{zmp}(p_{dy}-p_{by}) + K1_p(x_{dy}-x_{ry})$, where $p_{by}$ represents a y-coordinate of the zero moment point of the COM of the body, $p_{dy}$ represents a y-coordinate of the desired zero moment point of the COM of the body, $x_{ry}$ represents a y-coordinate of the actual position of the COM of the body, $x_{dy}$ represents a y-coordinate of the desired position of the COM of the body, and $a1_y$ represents the component of the first acceleration of the COM of the body on the y-axis.

9. The non-transitory computer-readable storage medium according to claim 7, wherein calculating the first position offset of the COM of the body according to the first acceleration and the velocity of the COM of the body at a previous moment, comprises:

calculating a component of the first position offset of the COM of the body on an x-axis according to a formula as follows:

$$\Delta x1 = v_x t + \frac{1}{2}a1_x t^2,$$

where $v_x$ represents a component of the velocity of the COM of the body at the previous moment on the x-axis, t represents running time of a preset program, and $\Delta x1$ represents the component of the first position offset of the COM of the body on the x-axis; and calculating a component of the first position offset of the COM of the body on a y-axis according to a formula as follows:

$$\Delta y1 = v_y t + \frac{1}{2}a1_y t^2,$$

where $v_y$ represents a component of the velocity of the COM of the body at the previous moment on the y-axis, t represents running time of the preset program, and $\Delta y1$ represents the component of the first position offset of the COM of the body on the y-axis.

10. The non-transitory computer-readable storage medium according to claim 6, wherein calculating the second position offset of the COM of the body according to the second acceleration and the velocity of the COM of the body at the previous moment, comprises:

calculating a component of the second position offset of the COM of the body on an x-axis according to a formula as follows:

$$\Delta x2 = v_x t + \frac{1}{2}a2_x t^2,$$

where $v_x$ represents a component of the velocity of the COM of the body at the previous moment on the x-axis, t represents running time of a preset program, and $\Delta x2$ represents component of the second position offset of the COM of the body on the x-axis; and calculating a component of the second position offset of the COM of the body on a y-axis according to a formula as follows:

$$\Delta y2 = v_y t + \frac{1}{2}a2_y t^2,$$

where $v_y$ represents a component of the velocity of the COM of the body at the previous moment on the y-axis, t represents running time of the preset program, and $\Delta y2$ represents the component of the second position offset of the COM of the body on the y-axis.

11. A robot comprising:
one or more processors;
a memory; and
one or more programs, wherein the one or more programs are stored in the memory and configured to be executed by the one or more processors, the one or more programs comprises:
instructions for obtaining force information associated with a left foot and a right foot of the robot;
instructions for calculating a zero moment point of a center of mass (COM) of a body of the robot based on the force information;
instructions for calculating a first position offset and a second position offset of the COM of the robot according to the zero moment point of the COM of the body;
instructions for updating a position trajectory of the COM of the robot according to the first position offset and the second offset to obtain an updated position of the COM of the body;
instructions for performing inverse kinematics analysis on the updated position of the COM of the body to obtain joint angles of the left leg and the right leg of the robot; and
instructions for controlling the robot to move according to the joint angles;
wherein calculating the second position offset comprises:
calculating a second acceleration of the COM of the body according to the zero moment point, an actual position, and a desired zero moment point of the COM of the body; and
calculating the second position offset of the COM of the body according to the second acceleration and a velocity of the COM of the body at a previous moment; and
wherein calculating the second acceleration of the COM of the body according to the zero moment point, the actual position, and the desired zero moment point of the COM of the body, comprises:
calculating a component of the second acceleration of the COM of the body on an x-axis according to a formula as follows:
$a2_x = K2_{zmp}(p_{dx}-p_{bx}) + K2_p(0-x_{rx})$, where $p_{bx}$ represents an x-coordinate of the zero moment point of the COM of the body, $p_{dx}$ represents an x-coordinate of the desired zero moment point of the COM of the body, $x_{rx}$ represents an x-coordinate of the actual position of the COM of the body, $K2_{zmp}$ represents a preset third coefficient, $K2_p$ represents a preset fourth coefficient, $a2_x$ represents the component of the second acceleration of the COM of the body on the x-axis; and
calculating a component of the second acceleration of the COM of the body on a y-axis according to a formula as follows:

$a2_y = K2_{zmp}(p_{dy} - p_{by}) + K2_p(0 - x_{ry})$, where $p_{by}$ represents a y-coordinate of the zero moment point of the COM of the body, $p_{dy}$ represents a y-coordinate of the desired zero moment point of the COM of the body, $x_{ry}$ represents a y-coordinate of the actual position of the COM of the body, and $a2_y$ represents the component of the second acceleration of the COM of the body on the y-axis.

12. The robot according to claim 11, wherein calculating the first position offset comprises:
   obtaining an actual position of the COM of the body, and determining a desired zero moment point and a desired position of the COM of the body according to the position trajectory of the robot;
   calculating a first acceleration of the COM of the body according to the zero moment point, the actual position, the desired zero moment point and the desired position of the COM of the body; and
   calculating the first position offset of the COM of the body according to the first acceleration and a velocity of the COM of the body at a previous moment.

13. The robot according to claim 12, wherein calculating the first acceleration of the COM of the body according to the zero moment point, the actual position, the desired zero moment point and the desired position of the COM of the body, comprises:
   calculating a component of the first acceleration of the COM of the body on an x-axis according to a formula as follows: $a1_x = K1_{zmp}(p_{dx} - p_{bx}) + K1_p(x_{dx} - x_{rx})$, where $p_{bx}$ represents an x-coordinate of the zero moment point of the COM of the body, $p_{dx}$ represents an x-coordinate of the desired zero moment point of the COM of the body, $x_{rx}$ represents an x-coordinate of the actual position of the COM of the body, $x_{dx}$ represents an x-coordinate of the desired position of the COM of the body, $K1_{zmp}$ represents a preset first coefficient, $K1_p$ represents a preset second coefficient, $a1_x$ represents the component of the first acceleration of the COM of the body on the x-axis; and
   calculating a component of the first acceleration of the COM of the body on a y-axis according to a formula as follows:
   $a1_y = K1_{zmp}(p_{dy} - p_{by}) + K1_p(x_{dy} - x_{ry})$, where $p_{by}$ represents a y-coordinate of the zero moment point of the COM of the body, $p_{dy}$ represents a y-coordinate of the desired zero moment point of the COM of the body, $x_{ry}$ represents a y-coordinate of the actual position of the COM of the body, $x_{dy}$ represents a y-coordinate of the desired position of the COM of the body, and $a1_y$ represents the component of the first acceleration of the COM of the body on the y-axis.

14. The robot according to claim 12, wherein calculating the first position offset of the COM of the body according to the first acceleration and the velocity of the COM of the body at a previous moment, comprises:
   calculating a component of the first position offset of the COM of the body on an x-axis according to a formula as follows:

$$\Delta x1 = v_x t + \frac{1}{2} a1_x t^2,$$

where $v_x$ represents a component of the velocity of the COM of the body at the previous moment on the x-axis, t represents running time of a preset program, and $\Delta x1$ represents the component of the first position offset of the COM of the body on the x-axis; and
   calculating a component of the first position offset of the COM of the body on a y-axis according to a formula as follows:

$$\Delta y1 = v_y t + \frac{1}{2} a1_y t^2,$$

where $v_y$ represents a component of the velocity of the COM of the body at the previous moment on the y-axis, t represents running time of the preset program, and $\Delta y1$ represents the component of the first position offset of the COM of the body on the y-axis.

15. The robot according to claim 11, wherein calculating the second position offset of the COM of the body according to the second acceleration and the velocity of the COM of the body at the previous moment, comprises:
   calculating a component of the second position offset of the COM of the body on an x-axis according to a formula as follows:

$$\Delta x2 = v_x t + \frac{1}{2} a2_x t^2,$$

where $v_x$ represents a component of the velocity of the COM of the body at the previous moment on the x-axis, t represents running time of a preset program, and $\Delta x2$ represents component of the second position offset of the COM of the body on the x-axis; and
   calculating a component of the second position offset of the COM of the body on a y-axis according to a formula as follows:

$$\Delta y2 = v_y t + \frac{1}{2} a2_y t^2,$$

where $v_y$ represents a component of the velocity of the COM of the body at the previous moment on the y-axis, t represents running time of the preset program, and $\Delta y2$ represents the component of the second position offset of the COM of the body on the y-axis.

* * * * *